UNITED STATES PATENT OFFICE.

BARNABAS WOOD, OF NASHVILLE, TENNESSEE.

METALLIC COMPOSITION FOR FUSIBLE ALLOY AND OTHER PURPOSES.

Specification forming part of Letters Patent No. 27,590, dated March 20, 1860.

*To all whom it may concern:*

Be it known that I, BARNABAS WOOD, of Nashville, in the county of Davidson, in the State of Tennessee, have invented a new and improved alloy or metallic composition suitable for a metallic cement in the manufacture of wares of tin, pewter, and other metals, also useful for casting and for other purposes; and I do hereby declare that the following is a full and accurate description thereof, reference being had to the accompanying specimens of the ingredients and of the composition.

The object of my invention being to produce an alloy possessing great fusibility in connection with the requisite tenacity and malleability suited for certain uses, I effect this object by the employment of cadmium in suitable proportions in combination with certain proportions of lead and tin, by which means I have produced an alloy which is superior to others in use in respect to the joint qualities above mentioned, and which as a metallic cement or solder in fabricating wares from certain metals is an improvement upon all others. It is claimed as an improvement upon the ordinary solders, especially for soldering metals consisting essentially of tin, such as pewter and other of the more fusible combinations of tin employed in the arts, and in general in all those cases which require an easily-melted and highly tenacious and malleable solder.

It consists of the following proportions, which may be somewhat modified in various ways without substantially modifying the result, to wit: cadmium, from one to two parts; lead, two parts; tin, four parts, the result as to fusibility and tenacity being nearly identical whether the cadmium be used in the larger or smaller ratio. This alloy possesses great strength and tenacity, is perfectly malleable, and melts at a temperature somewhat under 300° Fahrenheit, being some fifty or sixty degrees below the melting-point of the most fusible mixture of lead and tin used for solder, and not inferior in other qualities; and in the essentials of tenacity and malleability it is superior to any of the so-called "bismuth solders" which melt at as low a temperature. Its qualities render it likewise superior to any other alloy for casting and modeling purposes in certain cases, as will be at once evident to those versed in the business.

The specimen marked "No. 3," forwarded October 31, 1859, consists of one part cadmium, one part lead, and two and a half parts tin. Of the additional specimens, No. 4 contains two parts cadmium, two lead, and four tin; and No. 5, one part cadmium, two parts lead, and four tin. For greater fusibility, to suit particular cases, mercury may be added, although its tendency is, especially if used in large proportion, to impair the quality of tenacity, according as it improves that of fusibility; but it may be used in quantity at least equal to that of the cadmium without sensible detriment, while three or four times that amount will not so destroy the useful qualities of the composition but that it may be used to advantage as a solder for certain cases, thereby lowering its melting-point to nearly the temperature at which water boils. The greatest fusibility is obtained when cadmium is used in the proportions of the formula above named, or in the ratio of one-fourth to one-eighth of the joint quantity of lead and tin; but I do not confine myself to this ratio, as the cadmium, for economy, may be considerably reduced—say to one-tenth or one-twelfth of the other two metals—without materially diminishing this quality of the alloy for practical use.

Cadmium may be used upon the same principle to improve the ordinary tinners' solders, also called "fine" solders, consisting essentially of tin alloyed with lead in the proportion of about one part lead to two or three parts tin, being used in the ratio aforesaid in respect to the sum of these metals, thereby conferring greater fusibility than a like ratio of bismuth without, like bismuth, impairing the qualities of tenacity and malleability. The same holds in respect to the combinations of lead, tin, and bismuth, or "bismuth solders," in the more fusible forms of which the use of cadmium according to the same principles will produce results not hitherto obtained and of decided benefit. In particular, those mixtures of lead, tin, and bismuth which melt at or somewhat under the temperature of boiling water, and which in consequence of this extreme fluidity are known by the common name of "fusible' metal, may by the means indicated be greatly improved in this quality without detriment to other useful qualities, the use of cadmium in any form of these mixtures in amount equal to one-fourth or one-eighth of the amount of lead and tin in them producing about the greatest obtainable fusibility; although to insure the best results in respect to other qualities—as tenacity and pliability—it is better to use a little more lead and less tin than stated in the usual formulas of fusible metal.

I generally use the following proportions where the greater fusibility is required, to wit: cadmium, one to two parts; tin, two parts; lead, four parts; bismuth, seven to eight parts. The alloy in these proportions melting at about 160° Fahrenheit, being some 40° or 50° below the melting-point of the said fusible metal, and not inferior in other qualities for the purpose of a metallic cement. The specimen marked "No. 1" contains the larger proportion of cadmium, consisting of cadmium, fifty-six parts; tin, fifty-nine parts; lead, one hundred and three and one-half parts, and bismuth two hundred and twelve parts, being combined according to the chemical equivalent of the ingredients, conceiving the union to be more intimate and perfect, although subsequent experiment has not demonstrated any practical advantage to result from such nice adjustment of proportions. When the cadmium constitutes from one-tenth to one-twelfth of the joint amount of lead and tin the melting-point will be about 170° or 180° Fahrenheit, being low enough for general use in most cases. These proportions may be somewhat varied without materially modifying the result. The proportions of cadmium and bismuth remaining the same, those of the lead and tin may be greatly varied in respect to each other, provided they jointly hold a similar ratio to the whole. Thus for greater softness the lead may be employed in a much greater excess over the tin than stated in the formula, and for greater hardness and rigidity the tin may preponderate over the lead.

This alloy may be used as a cement for very fusible alloys, such as the white-metal used for bells, the *clinchee* of the French, and the so-called "fusible metal" above named; also for light wares of pewter, &c., and as a convenient temporary cement; also for light castings requiring a more fusible material than the bismuth alloys, not being liable to the objections appertaining to the amalgams resorted to in such cases. Its melting-point may be further lowered by adding mercury, which in quantity equal to one or two parts of the cadmium is less objectionable than in alloys without cadmium.

For greater tenacity, with a melting-point similar to that of the fusible metal before mentioned, a larger proportion of lead should be used, so that this metal shall equal or somewhat exceed the quantity of bismuth.

My mode of compounding the ingredients possesses nothing peculiar. They may be melted all together and mixed by stirring or melted separately and poured together. I usually melt the cadmium and lead together in one vessel and the tin or tin and bismuth in another, pouring them together when melted and mixing thoroughly by pouring the whole a few times from vessel to vessel. Mercury, when used, is added to the melted alloy, mixing as before. Nor is my manner of using the composition peculiar. The parts of the metals to be cemented are touched with a solution of chloride of zinc, and the solder applied as usual and fused by the application of heat in any of the ordinary modes. In casting, when used for taking casts or molds from other fusible metals, these should be brushed over with black-lead, lamp-black, india ink, or other pigment to prevent adhesion. A solution of logwood or red sanders in alcohol is very convenient for this purpose.

I do not claim the combination of lead and tin or of lead, tin, and bismuth in the proportions specified, nor any other separate and apart from cadmium; nor do I claim any results that have been produced by any of the combinations referred to apart from cadmium, whether that of fusibility or any other, nor any merely equivalent results that may have been hitherto produced by other combinations. I do not claim the use of cadmium as an alloy or as an ingredient in alloys to be anything new, nor its use in connection with any of the metals specified for the purpose of producing any results in alloys other than those described. I confine myself to its use in the ratio substantially as specified, in combination with the metals herein specified, in the proportions of said metals, substantially as set forth, so as to produces an improvement in alloys, whether in the qualities of fusibility and tenacity jointly or of either, but without practical detriment to the other, so as to produce a better article for use as a metallic cement and for certain other uses.

What I therefore claim as my invention, and desire to secure by Letters Patent, is—

1. The composition of matter or alloy, consisting of the following proportions of cadmium, lead, and tin, or any modification thereof, substantially as indicated, so as to produce a similar result in alloys—to wit, cadmium, from one to two parts; lead, two parts; tin, four parts—possessing the properties and advantages as herein described, and that may be used as a metallic cement and for other purposes, and to which also mercury may be added, as set forth, to modify the result for particular cases.

2. As a further application of the same principle embodied in the production of the aforesaid alloy, the composition of matter or alloy consisting of from one to two parts cadmium, two parts tin, four parts lead, and seven or eight parts bismuth, or any modification thereof, as herein specified and indicated, so as to produce an alloy, as described, useful as a cement and for other purposes, as set forth, and to which also mercury may be added, as stated, what I claim as new in either case being the herein specified improvement in alloys produced by using cadmium in the ratio and manner herein described, in combination with the metals specified in the proportions thereof substantially as set forth.

In testimony whereof I hereunto set my hand and seal this 31st day of October, 1859.

BARNABAS WOOD. [L. S.]

Witnesses:
    I. FLOWERS,
    W. V. CONOVER.